Aug. 14, 1951 F. KESSLER 2,564,013

TELEPHONE TEST SELECTOR

Filed June 17, 1949 3 Sheets-Sheet 1

INVENTOR.
FRANK KESSLER
BY
Winfred T. Powell
ATTORNEY

Aug. 14, 1951 F. KESSLER 2,564,013

TELEPHONE TEST SELECTOR

Filed June 17, 1949 3 Sheets-Sheet 2

INVENTOR.
FRANK KESSLER
BY
Winfred T. Powell
ATTORNEY

INVENTOR.
FRANK KESSLER
BY
Winfred T. Powell
ATTORNEY

Patented Aug. 14, 1951 2,564,013

UNITED STATES PATENT OFFICE 2,564,013

TELEPHONE TEST SELECTOR

Frank Kessler, Rochester, N. Y., assignor to Stromberg-Carlson Company, a corporation of New York Application June 17, 1949, Serial No. 99,739

20 Claims. (Cl. 179—175.2)

Figure 1:
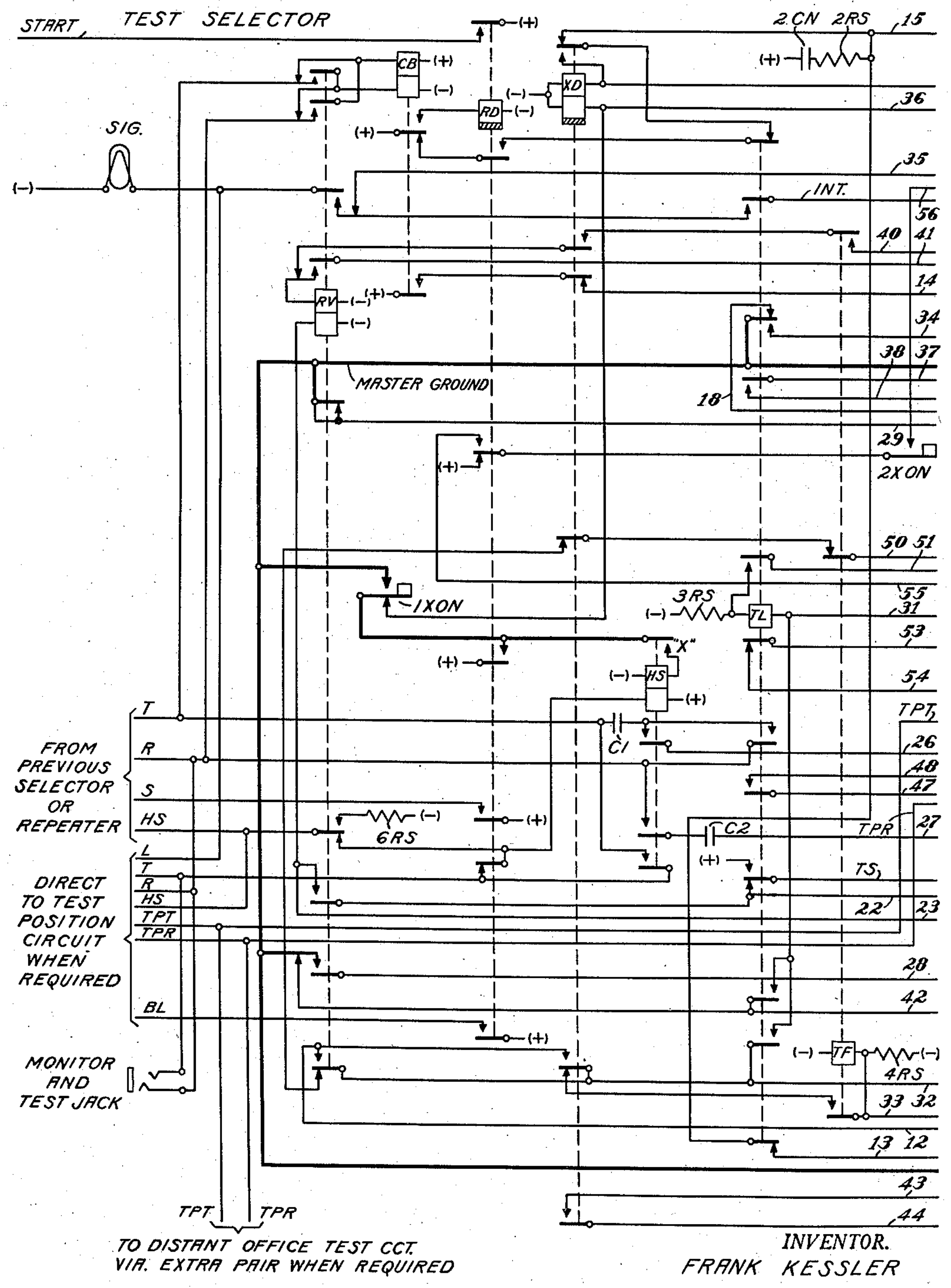

The present invention relates to automatic telephone systems and it more particularly pertains to test selectors for enabling a test operator, a wire chief or other telephone company employee to effect the busy verification or the automatic testing of lines in such systems.

More specifically, the present invention relates to improvements in test selectors of the character disclosed in the copending Kessler-Powell application Serial No. 76,366, filed February 14, 1949, and assigned to the same assignee as the present invention.

As an example of where the improved test selector of the present invention may be used, a community dial office may be considered, which is an unattended dial office having therein a test selector and one or more connector groups, each having therein a test connector.

In the case of a connection to a line in the community dial office for testing purposes, the test selector responds to one digit for selecting the test connector in the desired hundreds group. The test selector next repeats the tens and units digits to the selected test connector for advancing this connector to the terminals of the called line. The station digit is then dialed, which digit is not repeated to the selected test connector, the circuit being so arranged that the test connector can be advanced in its secondary movement, one step at a time, by dialing digit 1 after the station digit is dialed. The station digit is cancelled as far as stepping a switch is concerned, this digit being used to start the automatic testing operations.

One feature of the present invention is the provision of verification and automatic testing services in a locally controlled or a remotely controlled community dial office.

Another feature is an arrangement whereby a connection to a busy line effects a momentarily reversal of the battery back to the calling station as an indication that the called line is busy. This is of particular use to a line man or a trouble man who may call in from any local telephone in the communty dial office to a line to be tested and receive a single reverse battery click as an indication that the called line is busy.

Another feature is an arrangement whereby a verification operator may connect her talking circuit to a busy called line in order to instruct the parties on this busy line in any desired manner.

Still another feature of the present invention is an arrangement whereby supervision is returned to the incoming trunk over a fourth wire conductor.

A further feature of the present invention is the circuit arrangement of the test selector whereby the verification and test facilities are available to the calling operator, regardless of the number of preceding offices through which the connection is established.

Still another feature of the present invention is a monitor and test jack on the test selector for permitting a local attendant in the community dial office to control the selector in the same manner as when controlled from an operator's position.

An important and specific feature of the present invention is the operation of the test selector whereby the first digit dialed selects the desired test connector, the second and third digits set the test connector on the desired line and the fourth digit is cancelled to permit the test connector to remain in connection with the called line when this fourth digit is dialed. This feature permits the operator to dial the complete called number without the necessity of remembering to omit the last digit, while permitting the dialing of certain additional digits after the station digit is dialed without affecting the selected test connector.

Another important and specific feature of the present invention is the operation of the test selector whereby, in response to the dialing of the station digit, the called line, if idle, is automatically tested for a battery fault on either side of the line, a ground fault on either side of the line, or a short circuit on the line. During this automatic testing operation, flashing signals are returned to the calling test operator indicating whether the called line has a faulty condition thereon and, by means of the number of flashes returned, an indication of the type of fault encountered is given the test operator. Furthermore, a line man or a trouble man, knowing the combination of digits to be dialed can effect the same tests of the called line and, by means of the number of clicks sent back during the automatic test operations, determine the type of fault or the non-faulty condition of the line. After the automatic tests of the called line the circuits of the test selector await the next dialing operation, which may control a repetition of the automatic test of this same called line, the stepping of the test connector one step in its secondary direction (after which the automatic tests are made of the next line in the line group), the placing of the circuits in condition for a manual test of the called line, or the release of the test selector and test connector used in the connection.

Still another feature of the present invention is the provision of circuit means to enable the calling operator or service man to step the test connector across the bank one step at a time, by dialing digit 1 for each desired step. After this digit is dialed, the test selector performs the automatic testing operations.

Another and important feature of the present invention is the circuit arrangement of the test selector whereby the digit 2 may be dialed (and repeated as often as desired) for repeating the above mentioned automatic tests of the called line for a battery fault, ground fault and a loop fault and for transmitting back to the calling party an indication of the condition of the called line in accordance with the number of flashes or clicks sent back to the calling station by the operation of the reverse battery relay.

Another feature of the present invention is a circuit arrangement whereby the dialing station can dial number 3 after the called line has been selected for connecting the called line conductors back over an independent test circuit leading to the test position. This is useful where a distant office test operator effects the testing operations, since the control line circuit leading to the test position is connected to the called line through talking condensers so that the test operator can listen for a noisy line condition. Then by dialing number 3, as above mentioned, manual tests can be made over a separate pair of test conductors leading back to the test position and connected to the called line by way of the test selector circuit.

Still another important feature of the present invention is the circuit arrangement of the test selector whereby the calling party can dial number 4 after a called line has been selected for effecting the release of the test selector and the selected test connector. This places the circuits in readiness for selecting the same or another test connector by again dialing the proper hundreds digit.

A specific feature of the present invention is the circuit arrangement of the test selector whereby, during the automatic testing of a called line, a sensitive relay is locally energized and operated, then connected to the called line, after which the local energized circuit of the sensitive relay is disconnected to determine if there is a fault on the called line of the type tested for and of a value sufficient to hold the relay operated. If there is such a fault, the testing operation is stopped at this point, the calling party is advised of the type of fault by a flashing signal or by the number of clicks sent back to the calling station and the testing operation may then be repeated if desired.

Still a further feature of the present invention is the arrangement whereby the bank terminals of the test selector are connected in multiple to the wipers of the test connectors in all hundreds groups. This is possible because only one call can be set up to one test connector at any one time.

The foregoing and other features will be described hereinafter with reference to the accompanying drawings, which show diagramatically a sufficient amount of the equipment and circuits involved to enable one skilled in the art to understand the invention.

Figure 2:
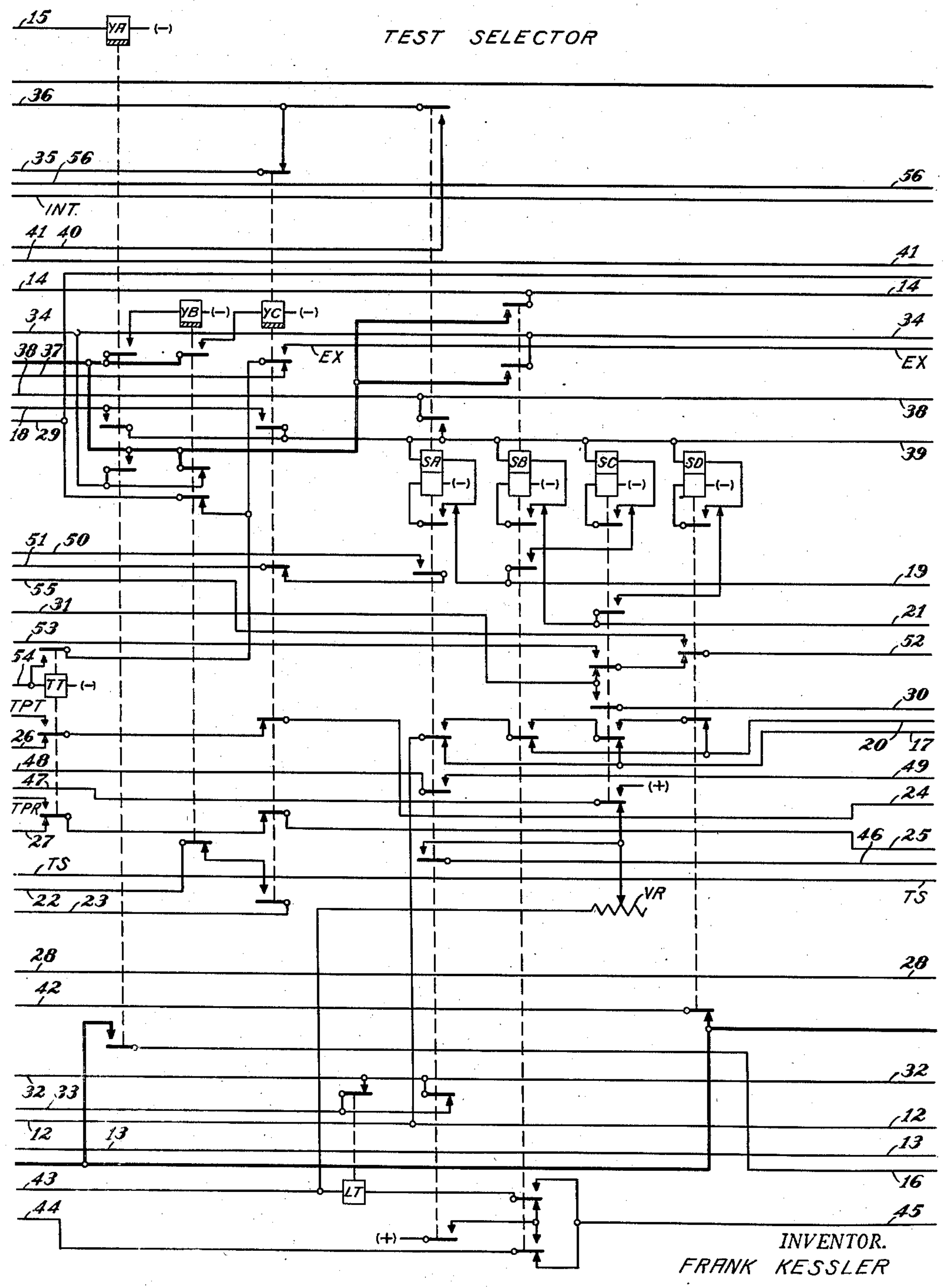
Figure 3:
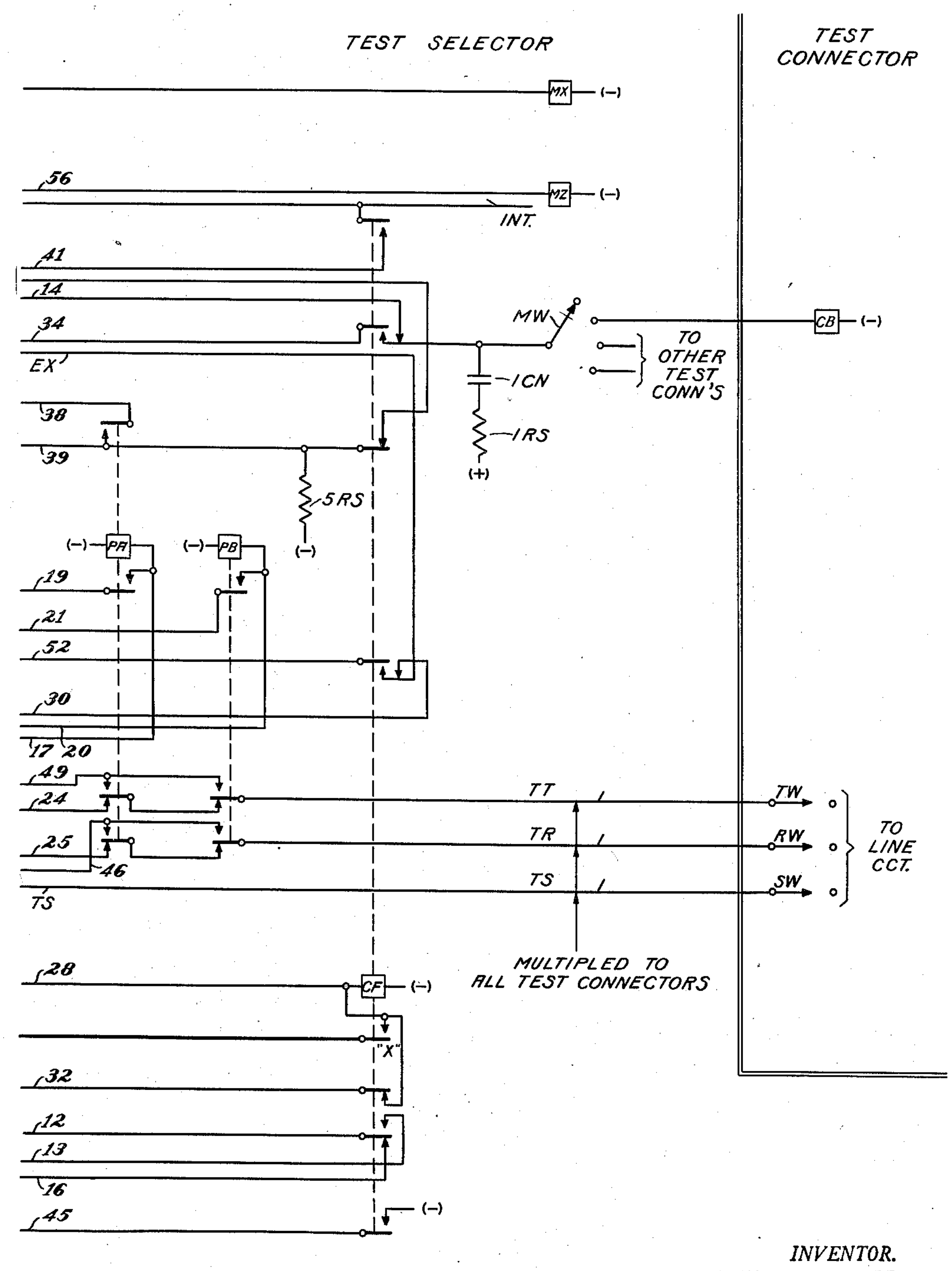

Referring now to the drawings, Figs. 1, 2 and 3, when placed in the order named and with correspondingly identified lines in alignment, show the test selector and a sufficient amount of the other circuits for an understanding of the invention. A detailed description of the circuit operations will now be given.

It will be pointed out at this time that the improvement in the present invention over that disclosed in the above mentioned Kessler-Powell application resides in the use of only one set of counting relays (instead of two in the prior application) for controlling the sequential operations of the system. Also, the test selector minor switch, as well as the selected test connector, is released when the special release digit is dialed, instead of releasing only the test connector as in the above mentioned prior application. Furthermore, the present circuits are arranged so that a trouble man can dial in from any line in the community dial office and cause the circuits to go through their automatic testing operations and for transmitting indications to the calling station, instead of restricting this operation to an operator's position.

Before proceeding with the detailed description, it may be well to point out that contacts 1XON and 2XON are controlled by the minor switch stepping magnet MX and release magnet MZ illustrated in Fig. 3. Also, wiper MW is controlled by minor switch stepping magnet MX to select terminals leading to the different connector groups, to which terminals control relays such as relay CB of the test connector illustrated in the extreme right hand portion of Fig. 3 are connected. The test connector has tip wiper TW, ring wiper RW and sleeve wiper SW associated therewith. The monitor and test jack illustrated in the left hand portion of Fig. 1 is mounted near the test selector equipment so that an attendant can plug into this jack and cause the test selector to go through its testing operations the same as when dialed from a distant point. Signal lamp SIG is mounted in some convenient location near the switch so that the attendant can obtain a visual indication during the test operations.

*Seizure of test selector*

When the test selector is seized by a preceding switching device, the closed circuit across the calling line (T and R conductors incoming to the test selector) operates relay CB over a circuit which may be traced from (+), upper winding of relay CB, break contact of relay RV, tip conductor T, over the preceding switching circuits, ring conductor R, break contact of relay RV and lower winding of relay CB to (−). Relay CB closes a circuit for operating relay RD extending from (+), make contact of relap CB and winding of relay RD to (−). Relay RD, at its uppermost make contact, applies (+) to the common start conductor for starting up the common interrupter apparatus. Relay RD also applies (+) to sleeve conductor S leading back to the preceding switching apparatus for making the test selector busy and for holding the connection including the preceding switching apparatus. Relay RD also applies (+) to conductor BL for lighting a busy lamp for indicating to the attendant at the local test position, when provided, that the test selector is in use. Relay RD also applies (+) potential to the heavy line conductor which is connected to the master ground circuit when the minor switch takes its first step off normal and closes contact 1XON. This (+) connected to the master ground conductor provides operating and hold circuits, as will be later described, and for releasing certain operated relays when the (+) potential is removed from the master ground conductor at the time of release. Assuming that this is a call from a test operator's position, (−) potential (not shown) will be applied to discriminating conductor HS either when the test selector is selected or when the dial is moved off normal for operating relay HS over a circuit extending from (+), lower winding of relay HS, break contact of relay RV and discriminating conductor HS to (−). When relay RD is operated, a locking circuit is closed for relay HS extending from (+), make contact of relay RD, make contact and upper winding of relay HS to (−). The X symbol associated with the upper make contact of relay HS indicates that the energization of this relay, by way of its lower winding might be only sufficient to close contact X, after which the upper winding is energized for operating all contacts of this relay. A circuit is closed at this time for operating relay XD extending from (+), make contact of relay RD, off normal contact 1XON in its normal position and lower winding of relay XD to (−).

*Dialing hundreds digit*

The test selector is now in condition to receive the hundreds digit for selecting the test connector in the desired hundreds group. In this example it will be assumed that number 1 is dialed for the hundreds digit, resulting in the transmission of one impulse to relay CB for effecting the single release of this relay, followed by its continued energization up to the time that the tens digit is dialed. The release of relay CB closes an operating circuit for magnet MX extending from (+), break contact of relay CB, make contact of relay RD, break contact of relay TL, make contact of relay XD and winding of magnet MX to (−). This steps the minor switch to its first terminal for selecting the test connector in the first hundreds group, magnet MX being de-energized and released when relay CB operates for opening up the above described circuit to magnet MX at the end of the impulse. A multiple circuit may be traced from the uppermost break contact of relay TL by way of the uppermost make contact and upper winding of relay XD to (−). This circuit holds relay XD operated during the transmission of the hundreds digit and relay XD releases when relay CB remains energized at the end of the digit. It will be noted that off normal contact 1XON extends (+) from a make contact of relay RD to the heavy line master ground conductor when the minor switch is stepped away from normal. This is of no effect at this time because no circuit is now connected to this master ground conductor. The control conductor leading to the CB relay of the test connector is now energized for operating this relay, this circuit being traced from (+), make contact of relay CB, break contact of relay XD, conductor 14, break contact of relay CF, wiper MW and winding of test connector relay CB to (−). Condenser 1CN and resistor 1RS are connected to this control circuit for spark suppression purposes.

*Dialing tens digit*

It will be assumed that the tens digit is number 1, thus effecting the single release of relay CB in response to the transmission of this digit.

The release of relay CB opens up the above described circuit leading to the control relay CB of the test connector for causing this relay to release and step the test connector one step in its primary or tens direction, after which the continued operation of relay CB keeps the control conductor closed for effecting the change over operation at the test connector in preparation for the units digit. The release of relay CB of the test selector also closes a circuit for operating relay YA which may be traced from (+), break contact of relay CB, make contact of relay RD, break contact of relay TL, break contact of relay XD, conductor 15 and winding of relay YA to (−). Condenser 2CN and resistor 2RS are connected to the conductor leading to the YA relay for spark absorbing purposes.

The operation of relay YA closes a circuit for operating relay YB extending from (+) on the master ground conductor, make contact of relay YA and winding of relay YB to (−). The operation of relay YA also closes a circuit for operating relay PA of the counting relay group, this counting relay group including relays PA, PB, SA, SB, SC and SD, this circuit extending from (+) on the master ground conductor, make contact of relay YA, conductor 16, break contact of relay CF, conductor 12, break contact of relay SA, conductor 17 and winding of relay PA to (−). The operation of relay YB closes a circuit for operating relay YC extending from (+) on the master ground conductor, make contact of relay YB and winding of relay YC to (−). When relay CB remains energized at the end of the impulse transmission for the tens digit, relay YA is released for opening up and releasing relay YB which in turn releases relay YC. The release of relay YA closes an operating circuit for relay SA and a locking circuit for relay PA extending from (+) on the master ground conductor, break contact of relay TL, conductor 18, make contact of relay YC, upper winding of relay SA, break contact of relay SA, conductor 19, make contact and winding of relay PA to (−). This circuit is effective because relay YA releases and opens up the above described operating circuit for relay PA. Relay SA closes a locking circuit for itself extending from (+) by way of its upper winding (above traced), make contact and lower winding of relay SA to (−).

*Dialing units digit*

The circuits are now in condition for receiving the units digit and it will be assumed that number 1 is transmitted for this digit, thus again effecting the single momentary release of relay CB. The release of relay CB again opens up the control conductor leading to the CB relay of the selected test connector and when relay CB operates at the end of the impulse, relay CB of the test connector is again energized, thus transmitting one impulse for causing the test connector to take one step in its secondary direction. Relays YA, YB and YC are again operated over the previously described circuits and at the end of the units digit, these relays are again released in sequence as previously described. The operation of relay YA at this time closes a circuit for operating relay PB extending from (+) on the master ground conductor, make contact of relay YA, conductor 16, break contact of relay CF, conductor 12, make contact of relay SA, break contact of relay SB, conductor 20 and winding of relay PB to (−). When relay YA is released at the end of the units impulse transmission, relay SB operates and relay PB is locked over a circuit extending from (+) on the master ground conductor, break contact of relay TL, conductor 18, make contact of relay YC, upper winding of relay SB, break contact of relay SB, conductor 21, make contact and winding of relay PB to (—). This circuit is effective because the release of relay YA opens up the above described operating circuit for relay PB. Relay SB is now locked over the above described circuit through the upper winding of relay SB, make contact and lower winding of relay SB to (—).

With relay SB operated and with relay YC operated a test is made of the called line to determine if it is idle or busy. The test circuit for the called line extends from the sleeve conductor of this line, the sleeve wiper of the test connector SW, common conductor TS, break contact of relay TL, conductor 22, break contact of relay YB, make contact of relay YC, conductor 23 and lower winding of relay RV to (—). It will be assumed that the called line is idle, consequently there is no (+) potential connected to the sleeve conductor of this line and relay RV will not be operated.

Before the station digit is dialed, the calling operator may make a busy verification or toll offering test to the called line, i. e., a talking circuit is set up to this line so that the calling operator can give directions to the talking parties on the busy connection. This talking circuit may be traced by way of the tip and ring wipers TW and RW of the test connector, common conductors TT and TR, break contacts of relays PB and PA, conductors 24 and 25, break contacts of relay YC, break contacts of relay TT, conductors 26 and 27, make contacts of relay HS and condensers C1 and C2 to the incoming line conductors T and R.

*Called line busy*

Referring back to the time that the called line is tested to determine if it is idle or busy following the transmission of the units digit, it wll now be assumed that ths line is busy as characterized by (+) potential found on the terminal to which wiper SW is connected. It will be recalled that this testing operation is effective when relay YB releases and before relay YC is released. A circuit is closed at this time for operating relay RV which may be traced from (+) by way of test connector wiper SW, common conductor TS, break contact of relay TL, conductor 22, break contact of relay YB, make contact of relay YC, conductor 23 and lower winding or relay RV to (—). Relay RV closes a locking circuit for itself to (+) on the sleeve terminal of the called line over the above described circuit from conductor TS, break contact of relay TL, make contact and lower winding of relay RV to (—). This operation of relay RV transmits a single click back to the calling station as an indication that the called line is busy.

A circuit is now closed for operating relay CF extending from (+) on the master ground conductor, make contact of relay RV, conductor 28 and winding of relay CF to (—). Relay CF closes a locking circuit for itself extending from (+) on the master ground conductor, X make contact and winding of relay CF to (—). When relay YC releases, the above described locking circuits for the SA and SB relays are opened for effecting the release of these two relays. This places the circuits in condition for operation in response to the next dialing operation, for example dialing number 1 to advance the connector one step in its secondary direction. This connector advance operation will be later described, it being only necessary to point out at this time that relays YA, YB and YC are sequentially operated in response to the impulse transmission, thus the advance of the test connector away from the grounded sleeve terminal opens up the above described locking circuit for relay RV for effecting the release of this relay. If the next terminal to which the connector is advanced is also busy, the busy test is made of this next called line when relay YB is released before the release of relay YC, in the previously described manner.

*Dialing station digit*

It will now be assumed that the calling operator is ready to set the test selector circuits for making the automatic tests of the called line. In order to start up these automatic testing operations the station digit is dialed and in this example it will be assumed that this digit is number 1, thus resulting in the transmission of a single impulse to relay CB of the test selector for causing its single release after which it remains energized. Since the desired called line has been selected, this station impulse must not release relay CB of the test connector, because this would cause the test connector to take one step away from the desired called line. Consequently, the control conductor leading to the test connector is maintained energized during the transmission of the station digit over a circuit which may be traced from (+) on the master ground conductor, make contact of relay SB, conductor 14, break contact of relay CF and wiper MW to the control relay of this test connector. This transmission of the station digit effects the sequential operation and release of relays YA, YB and YC in the previously described manner. The operation of relay YA closes a circuit for again operating relay PA which may be traced from (+) on the master ground conductor, make contact of relay YA, conductor 16, break contact of relay CF, conductor 12, make contact of relay SA, make contact of relay SB, break contact of relay SC, conductor 17 and winding of relay PA to (—). Now when relay YA releases at the end of the station impulse transmission, relay SC is operated and relay PA is locked over a circuit extending from (+) on the master ground conductor, break contact of relay TL, conductor 18, make contact of relay YC, upper winding of relay SC, break contact of relay SC, make contact of relay SB, conductor 19, make contact and winding of relay PA to (—). This locking circuit is effective because the release of relay YA opens up the above described operating circuit for relay PA. Relay SC closes a locking circuit for itself extending from the above described circuit through its upper winding, make contact and lower winding of relay SC to (—). The operation of relay SC opens the locking circuit for relay PA for effecting the release of this relay. It might be pointed out at this time that the previous operation and locking of relay SA opened up the locking circuit for relay PA for causing it to release when it was first operated. Also, the previously described operation and locking of relay SB opens up the locking circuit for relay PB for causing the release of this relay.

In response to the completion of the transmission of the station digit an executing circuit is now closed for starting up the automatic testing operations. This executing circuit is effective with relay YB released and before relay YC loses its slow acting characteristics and releases. This executing circuit operates relay TL over a circuit which may be traced from (+) on the master ground conductor, conductor 29, break contact of relay YB, make contact of relay YC, executing conductor EX, break contact of relay CF, conductor 30, make contact of relay SC, conductor 31, winding of relay TL and resistor 3RS to (—). Relay TL closes a locking circuit for itself extending from (+) on the master ground conductor, break contact of relay RV, make contact and winding of relay TL to (—) through resistor 3RS. The operation of relay TL effects the release of relays SA, SB and SC by disconnecting the master ground conductor from conductor 18.

A circuit is now closed for operating relay CF extending from (+) on the master ground conductor, break contact of relay RV, make contacts in series of relay TL, conductor 32, break contact and winding of relay CF to (—). Relay CF closes a locking circuit for itself at its X contact from (+) on the master ground conductor, make contact and winding of relay CF to (—). Relay TF is now operated over a circuit which may be traced from (+) on the master ground conductor, break contact of relay RV, make contact in series of relay TL, conductor 32, break contact of relay LT, conductor 33 and winding of relay TF to (—). Resistor 4RS is connected in multiple with the winding of relay TF for spark absorbing purposes. Relay TF closes a locking circuit for itself extending from (+) on the master ground conductor, break contact of relay RV, make contacts in series of relay TL, break contact of relay XD, make contact and winding of relay TF to (—).

It will be noted that the inadvertent turning of the dial at this time will be ineffective to interfere with the circuit operations because the pulsing circuit through the break contact of relay CB is open at the uppermost break contact of relay TL. The release of relay SB in response to the operation of relay TL, above described, opens up the above described holding circuit to the test connector but before this happens relay YB is released for providing a substitute holding circuit for the test connector, this substitute circuit being traced from (+) on the master ground conductor, break contact of relay YB, conductor 34, make contact of relay CF and wiper MW to the test connector control relay. The called line is now made busy and the cut off relay of this line is operated over a circuit which may be traced from (+), make contact of relay TL, conductor TS and wiper SW of the test conductor to the sleeve of the called line.

*Automatic testing of called line*

When the common interrupter lead is energized, following the relay operations in response to the station digit as above described, a circuit is closed for operating relay XD extending from (+) on common interrupter INT, make contact of relay TL, break contact of relay RV, conductor 35, break contact of relay YC, conductor 36 and lower winding of relay XD to (—). A circuit is now closed for operating relay PA extending from (+) on the master ground conductor, break contact of relay RV, make contacts in series of relay TL, make contact of relay XD, conductor 12, break contact of relay SA, conductor 17 and winding of relay PA to (—). When (+) is removed from the common interrupter lead at the termination of the impulse on this lead, relay XD is released and relay SA is operated and relay PA is locked operated over a circuit which may be traced from (+) on the master ground conductor, conductor 29, break contact of relay YB, break contact of relay YC, conductor 37, make contact of relay TL, conductor 38, make contact of relay PA, conductor 39, upper winding of relay SA, break contact of relay SA, conductor 19, make contact and winding of relay PA to (—). This circuit is effective because relay XD in releasing opens up the above described operating circuit for relay PA. Relay SA closes a locking circuit for itself including the above described circuit and its upper winding, makes contact and lower winding of relay SA to (—). The operation of relay SA opens up and releases relay PA. The above described locking circuit for relay TF is opened by the operation of relay XD but relay TF does not release at this time because of a holding circuit for this relay extending from (+), break contact of relay RV, make contacts in series of relay TL, conductor 32, break contact of relay LT, conductor 33 and winding of relay TF to (—). This first interrupter pulse for operating relay XD, which in turn operates and releases relay PA and operates relay SA, is for the purpose of holding off the start of the testing operations until one pulse has been counted off on the common interrupter circuit. This prevents any short or mutilated operation of the testing circuit if it should be started late during the impulse period of the common interrupter.

With relay SA operated, the next pulse on interrupter INT is effective to again operate relay XD for now closing a circuit for operating relay PB, this circuit extending from (+) on the master ground conductor, break contact of relay RV, make contacts in series of relay TL, make contact of relay XD, conductor 12, make contact of relay SA, break contact of relay SB, conductor 20 and winding of relay PB to (—). The pulse on common interrupter INT also closes a circuit for operating relay RV extending from this common interrupter, make contact of relay TL, break contact of relay RV, conductor 35, break contact of relay YC, make contact of relay SA, conductor 40, make contact of relay TF, make contact of relay XD, break contact and upper winding of relay RV to (—). Relay RV locks itself operated until the termination of the pulse on conductor INT over a circuit extending from this conductor, make contact of relay CF, conductor 41, make contact and upper winding of relay RV to (—). The termination of this pulse on conductor INT effects the release of relay RV. The operation of relay RV opens up the above described circuit to the lower winding of relay XD for effecting the release of this relay.

When the (+) potential is removed from conductor INT for releasing relay RV at the termination of the second impulse, relay SB is operated and relay PB is locked operated over a circuit which may be traced from (+) on the master ground conductor, conductor 29, break contact of relay YB, break contact of relay YC, conductor 37, make contact of relay TL, conductor 38, make contact of relay SA, upper winding of relay SB, break contact relay SB, conductor 21, make contact and winding of relay PB to (—). This circuit is effective because the above described operating circuit for relay PB is opened by the release of relay RV. The operation of relay SB closes a locking circuit for itself including its upper winding and the above described circuit, make contact and lower winding of relay SB to (—). The operation of relay SB opens up and releases relay PB.

At the beginning of the third impulse on conductor INT, relay XD is again operated over the previously described circuit for closing a circuit for again operating relay PA, this circuit extending from (+) on the master ground conductor, break contact of relay RV, make contacts in series of relay TL, make contact of relay XD, conductor 12, make contact of relay SA, make contact of relay SB, break contact of relay SC, conductor 17 and winding of relay PA to (—). It will be noted that this same circuit is completed at the lowermost make contact of relay RV, this latter relay now being operated over a circuit extending from common interrupter INT, make contact of relay TL, break contact of relay RV, conductor 35, break contact of relay YC, make contact of relay SA, conductor 40, make contact of relay TF, make contact of relay XD, break contact and upper winding of relay RV to (—). Relay RV is again operated and locked as before until conductor INT is de-energized at the end of the pulsing period. The operation of relay RV again opens up and releases relay XD.

When relay RV releases at the end of the third impulse period, relay SC is operated and relay PA is locked operated over a circuit extending from (+) on the master ground conductor, conductor 29, break contact of relay YB, break contact of relay YC, conductor 37, make contact of relay TL, conductor 38, make contact of relay SA, upper winding of relay SC, break contact of relay SC, make contact of relay SB, conductor 19, make contact and winding of relay PA to (—). This circuit is effective because both relays XD and RV are released for de-energizing the above described operating circuit for relay PA. Relay SC locks over the above described circuit, its upper winding, make contact and lower winding of relay SC to (—). The operation of relay SC opens up and releases relay PA.

At the beginning of the fourth impulse on conductor INT, relay XD is again operated for operating relay PB over a circuit extending from (+) on the master ground conductor, break contact of relay RV, make contacts in series of relay TL, make contact of relay XD, conductor 12, make contact of relay SA, make contact of relay SB, make contact of relay SC, break contact of relay SD, conductor 20 and winding of relay PB to (—). Relay RV is again operated over the above described circuit including conductor INT, make contact of relay TL, break contact of relay RV, conductor 35, break contact of relay YC, make contact of relay SA, conductor 40, make contact of relay TF, make contact of relay XD, break contact and upper winding of relay RV to (—). Relay RV is again locked until the termination of the pulse on conductor INT over the above previously described circuit including make contacts of relays CF and RV. The operation of relay RV opens up and releases relay XD and relay RV is released when its above described locking circuit to conductor INT is de-energized. The release of relay RV completes a circuit for operating relay SD and locking relay PB, this circuit extending from (+) on the master ground conductor, conductor 29, break contact of relay YB, break contact of relay YC, conductor 37, make contact of relay TL, conductor 38, make contact of relay SA, upper winding of relay SD, break contact of relay SD, make contact of relay SC, conductor 21, make contact and winding of relay PB to (—). This circuit is effective because the release of relay RV (with relay XD released) opens up the above described operating circuit for relay PB. Relay SD locks itself operated over the above described circuit including its upper winding, make contact and lower winding to (—). The operation of relay SD opens up and releases relay PB.

At the beginning of the fifth impulse on conductor INT, relay XD is again operated over the above described circuit for again closing the above described circuit for operating relay RV, this latter relay locking to conductor INT until the termination of this fifth impulse. The operation of relay RV again opens up and releases relay XD. Since this is the last impulse of the series during the automatic testing operations, it is now in order to release relay TL. This is effected by opening up the above described locking circuit for relay TL by the operation of relay RV (its make before break contact disconnects the master ground conductor from this locking circuit), while at this same time relay SD disconnects the master ground conductor from conductor 42 and the locking circuit for relay TL. The release of relay TL opens up the above described circuit to the upper winding of the SA, SB, SC and SD relays for effecting the release of these relays. It will thus be noted that this fifth impulse on conductor INT serves as a clearing out impulse for restoring the circuits to their condition awaiting the dialing of the next digit or the release of the connection. During the above described operations in response to these five impulses on conductor INT, certain priming and testing operations are effective as will now be described.

It will first be assumed that the circuits go through the above described line testing operations and that no trouble is encountered on the line being tested. This means that relay TL will be released and the circuits cleared out as above described. The automatic test of the line is made by first energizing line test relay LT by way of a priming circuit, then disconnecting the priming circuit to determine if relay LT will release or not. It will be released at each of the four testing positions when there is no trouble on the called line. The priming circuit for relay LT is first closed when relay XD is operated by the second of the above described five impulses on conductor INT. This circuit may be traced from (+), make contact of relay SA, break contact of relay SB, winding of relay LT, conductor 43, make contact of relay XD, conductor 44, break contact of relay SB, conductor 45 and make contact of relay CF to (—). Relay LT is operated over this priming circuit and when relay XD is released, the above described priming circuit is opened and relay LT is connected to the line conductors by way of a circuit which may be traced from (+), make contact of relay SA, break contact of relay SB, winding of relay LT, variable resistor VR, make contact of relay SA, conductor 46, make contact of relay PB, conductor TR and wiper RW to the ring side of the line. A circuit from the variable resistor VR may also be traced through break contact of relay SC, conductor 47, make contact of relay PL, conductor 48, make contact of relay SA, conductor 49, make contact of relay PB and conductor TT to the tip side of the line by way of wiper TW. Since it is assumed that there is no (—) fault on the called line, relay LT will be released. When relay XD is operated for operating relay LT, the above described locking circuit for relay TF is opened. When relay LT is operated (relay SA being operated at this time) the circuit to the winding of relay TF is open for effecting the release of this relay. Now when relay LT is released, relay TF is again operated over a circuit extending from (+) on the master ground conductor, break contact of relay RV, make contacts in series of relay TL, conductor 32, break contact of relay LT, conductor 33 and winding of relay TF to (−). Relay TF again closes a locking circuit for itself including the break contact of relay XD.

The priming circuit is next closed for operating relay LT when relay XD is next operated, this circuit extending from (+), make contact of relay SA, make contact of relay SB, conductor 44, make contact of relay XD, conductor 43, winding of relay LT, make contact of relay SB, conductor 45 and make contact of relay CF to (−). The operation of relay XD and the operation of relay LT opens up the above described locking and operating circuits of relay TF for again effecting the release of this relay. When relay XD releases, the two line conductors are connected to (−) for making a test of these conductors for a (+) fault. This connection may be traced from the ring side of the called line, test connector wiper RW, break contact of relay PB, make contact of relay PA, conductor 46, make contact of relay SA, variable resistor VR, winding of relay LT, make contact of relay SB, conductor 45 and make contact of relay CF to (−). The tip line conductor may be traced by way of wiper TW of the test connector, break contact of relay PB, make contact of relay PA, conductor 49, make contact of relay SA, conductor 48, make contact of relay TL, conductor 47 and break contact of relay SC to the terminal of resistor VR which is connected to the ring line conductor. Consequently, when relay XD releases to open up the priming circuit of relay LT, this relay is released because there is no ground fault on the called line. The release of relay LT operates relay TF and it locks over the previously described circuit.

When relay XD is operated at the beginning of the next impulse on conductor INT, relay LT is energized over a circuit which may be traced from (+), make contact of relay SA, make contact of relay SB, conductor 44, make contact of relay XD, conductor 43, winding of relay LT, make contact of relay SB, conductor 45 and make contact of relay CF to (−). This operation of relays XD and LT again opens up the locking and operating circuits for relay TF for again releasing this relay. When relay XD releases the above described priming circuit is opened and a test is made of the called line for a cross or short circuit, this test extending from (+), make contact of relay SC, conductor 47, make contact of relay TL, conductor 48, make contact of relay SA, conductor 49, make contact of relay PB, conductor TT and wiper TW to the tip side of the called line, ring side of the called line, wiper RW and conductor TR, make contact of relay PB, conductor 46, make contact of relay SA, resistor VR, winding of relay LT, make contact of relay SB, conductor 45 and make contact of relay CF to (−). Since it is assumed that there is no cross or short circuit on the called line, relay LT will release for again operating and locking relay TF over the above described circuit.

When relay RV is operated by the next impulse on conductor INT, a circuit is again closed for relay LT extending from (+), make contact of relay SA, make contact of relay SB, conductor 44, make contact of relay XD, conductor 43, winding of relay LT, make contact of relay SB, conductor 45 and make contact of relay CF to (−). When relay TL is released at this time, as above described, the above described circuit is opened for effecting the release of relay LT, this operation of relay LT being of no consequence at this time.

It will thus been seen that relay RV is operated four times for transmitting four click signals back to the calling station as an indication that there is no trouble on the called line. RV also flashes signal lamp SIG four times as an indication to a switchboard attendant that the circuits have gone through their automatic testing operations without finding any trouble on the called line. Furthermore, relay RV intermittently connects (−) through resistor 6RS to conductor HS for controlling supervisory signals in circuits which use the HS conductor for this purpose.

It will now be explained how the circuits operate during the automatic testing operations when a trouble condition is found on the called line. In this example, it will be assumed that the pick up pulse effects the operations of relays XD and PA at the beginning of this pulse, with relay XD being released, relay SA being operated and locked and relay PA being released at the termination of the pulse, all in the previously described manner. It will furthermore be assumed that the test for a (−) fault locates no such trouble on the line, consequently the second operation and release of relay XD effects the operation of relay PB, the operation of relay SB and the release of relay PB at the termination of this second pulse. Relay LT is primed, relay RV is operated and locked as before, relay TF is released and again operated, after which relay RV is again released at the termination of the (−) test pulse, all in the previously described manner.

When the (+) test pulse is applied, relay XD is again operated for operating and locking relay RV, after which relay XD is released. Relay PA is operated and relay LT is again operated by way of its priming circuit. The operation of relay LT again opens up and releases relay TF. In this example, it will be assumed that there is a (+) fault on the line. Consequently, the release of relay XD does not effect the release of relay LT, as in the previous example, this relay now being held operated to the (+) fault on either side of the called line. If this (+) fault is found on the tip side of the line, a holding circuit for relay LT may be traced from (+) on the tip side of the called line, wiper TW, conductor TT, break contact of relay PB, make contact of relay PA, conductor 49, make contact of relay SA, conductor 48, make contact of relay TL, conductor 47, break contact of relay SC, resistor VR, winding of relay LT, make contact of relay SB, conductor 45 and make contact of relay CF to (−). If a (+) fault is found on the ring side of the called line, then a circuit may be traced from (+) on this line conductor, wiper, RW, conductor TR, break contact of relay PB, make contact of relay PA, conductor 46, make contact of relay SA, resistor VR, winding of relay LT, make contact of relay SB, conductor 45 and make contact of relay CF to (−). Since relay LT remains operated, the circuit for relay TF is maintained open, thus preventing the operation of the TF relay at this time. Relay TL is now released by short circuiting its winding, recalling that (+) is applied to the right hand terminal of this winding by way of its above described locking circuit. The circuit for applying (+) to the left hand terminal of the TL relay winding may be traced from (+) on the master ground conductor, break contact of relay RV (released when the (+) on conductor INT is terminated), make contacts in series of relay TL, break contact of relay RV, break contact of relay XD, break contact of relay TF, conductor 50, make contact of relay SA, break contact of relay YC, conductor 51, and make contact of relay TL to its left hand terminal. This effects the release of relay TL for clearing out the circuit in the previously described manner. Since relays YA and YC are released at this time, the release of relay TL opens up the upper windings of the SA, SB, SC and SD relays for effecting the release of whichever of these relays are in their operated positions.

Since relay RV was only operated twice under the above assumed condition, two clicks are transmitted back to the calling line and two supervisory impulses are transmitted back to the preceding circuits as an indication that there is a (+) fault on this line. From the above example, it is believed clear how the circuits will be stopped at other points in the cycle when other types of faults are found on the called line. For example, if a (−) fault is found on the called line, relay LT will be maintained operated when this (−) test is made for preventing the operation of relay TF and for effecting the release of relay TL at this time for clearing out the circuits. In this case, only one operation of relay RV is effective for transmitting this particular indication. If the circuits go through to the point in the cycle where the short circuit or cross test is made, then the circuits will again be cleared out in the same manner with three operations of relay RV being effective to transmit three clicks and three supervisory signals back to the calling portion of the circuit as an indication of the particular trouble condition encountered.

During the automatic testing of the called line and the indication transmission back to the calling station by the intermittent operations of relay RV, it has been found desirable to tone down the intensity of these indication clicks. This is done by connecting talking condenser C1 across the incoming conductors while relay TL is operated, this latter relay being in its operated position during these testing operations. This condenser circuit may be traced from the tip conductor, condenser C1 and make contact of relay TL to ring conductor R. It will be recalled that the circuit from the calling line conductors to the called line conductors is open during these automatic testing operations because either relay PA or PB will be operated when the tests are applied to the called line.

It will also be pointed out at this time that the called line is made busy during these testing operations by the operation of relay TL, this latter relay connecting (+) to sleeve wiper SW. It might also be pointed out at this time that there is a circuit arrangement provided to hold off the shift in the called line connections until relay RV is released and a preceding test is completed. This is done by the lowermost make contact of relay RV connecting (+) from the master ground conductor (by way of break contact of relay SD, conductor 42 and make contacts in series of relay TL) to conductor 12 which leads to the PA and PB relays. This prevents the de-energization of conductor 12 and the consequent operation of the next S relay by way of the previously described locking circuit for the PA and PB relays until relay RV has been released by the termination of the pulse on interrupter conductor INT.

*Dialing 1 to step the test connector*

Assuming that the calling party desires to advance the test connector one step in its secondary direction, number 1 will be dialed for effecting one pulse of relay CB. At this time, it will be noted that relays RD, HS and CF are operated and that all other relays of the test selector are released. Relay CB of the test connector is energized at this time by way of the previously described circuit to the break contact of relay YB and (+) on the master ground conductor.

The release of relay CB closes the above described circuits for effecting the sequential operations and release of relays YA, YB and YC in the previously described manner. Relay PA is also operated by way of the break contact of relay CB in multiple with relay YA as previously described. When relay CB operates at the end of this single impulse, relay SA is operated and relay PA is locked over a circuit extending from (+) on the master ground conductor, break contact of relay TL, conductor 18, make contacts of relays YA and YC in multiple, upper winding of relay SA, break contact of relay SA, conductor 19, make contact and winding of relay PA to (−). Relay SA operates, locks and releases relay PA in the previously described manner. Since this is the end of this impulse transmission, the release of relay YA, while relay YB is still operated disconnects the master ground conductor from conductor 34 which leads by way of the make contact of relay CF and wiper MW to the CB relay of the test connector. When relay YB releases, this master ground conductor is again connected to the circuit leading to the test connector CB relay. This interrupts the circuit to relay CB of the test connector long enough to provide one impulse to step the connector one step in its secondary direction. The control conductor leading to the CB relay of the test connector is now maintained energized over the circuit through the break contact of relay YB. With relay YB released and relay YC operated the above described test of the called line is made to determine if this next line is busy or idle.

The release of relay YB, with relay YC operated, completes a circuit for operating relay TL extending from (+) on the master ground conductor, conductor 29, break contact of relay YB, make contact of relay YC, executing conductor EX, make contact of relay CF, conductor 52, break contact of relay SD, break contact of relay SC, conductor 31 and winding of relay TL to (−). Relay TL locks by way of its previously described locking circuit and relay TF is operated over a circuit extending from the locking circuit of relay TL, conductor 32, break contact of relay LT, conductor 33 and winding of relay TF to (−). Relay TF locks to (+) on the locking circuit of relay TL by way of the break contact of relay XD.

When the first pulse is applied to conductor INT, following the operation of relay TL, the automatic testing operations are again started and the circuits run through these tests in the previously described manner, with relays TL and TF being released at the end of the testing operations.

*Dialing #2 to repeat automatic tests*

It will now be assumed that the calling party wishes to have the automatic test of the called line repeated, and in order to do this the digit 2 is dialed. This digit must leave the test connector in connection with the line to which it was connected and the automatic testing operations must be repeated in the previously described manner. It will be understood that these two impulses are repeated by relay CB of the test selector. The first release of relay CB closes the previously described operating circuit for relay YA, thus effecting the sequential operations of relays YA, YB and YC as before. Since relay YA is slow acting, it remains operated until the end of the digit at which time relays YA, YB and YC are released in sequence. The first release of relay CB closes the above described circuit for operating relay PA and at the end of this impulse, when relay CB again operates, relay SA is operated and locked and relay PA is released. The second release of relay CB closes the previously described circuit for operating relay PB and at the end of this impulse the operation of relay CB operates and locks relay SB and releases relay PB. With relay YB released and before relay YC releases, the above described circuit is again completed for making a test of the busy or idle condition of the called line, it being understood that relay TL was released near the end of the previous automatic testing of the called line, so that it is necessary to again test the sleeve conductor of this line to determine if it had become busy before the dialing operation for repeating the test.

The release of relay YB closes the previously described executing circuit, including conductor EX for again operating and locking relay TL. Relay TL extends this locking circuit to the winding of relay TF for operating and locking this relay, all in the previously described manner. The operation of relay TL opens up and releases relays SA and SB. In order to maintain the control conductor to the winding of relay CB of the test connector energized during this "repeat test" operation, a circuit is closed from the master ground conductor by way of a make contact of relay YA, conductor 34 and a make contact of relay CF to wiper MW before relay YB is operated to disconnect this master ground conductor from the MW wiper. Relay YA remains operated until shortly after the end of this series of impulses and before relay YA is released, relay SB is operated for connecting the master ground conductor to wiper MW, thus maintaining this conductor energized to prevent stepping of the test connector switch. Relay YB releases to connect the master ground conductor to wiper MW before relay SB is released by the operation of relay TL.

This leaves the circuit in condition for again starting the automatic testing operations. The first energization of conductor INT after relay TL is operated is effective to start the automatic testing operations and this cycle of operations is effected in the previously described manner.

*Testing from test position*

It will now be assumed that the test operator, either in the distant office or in the office where the test selector is located, desires to set up the circuits so that a manual test can be made on the called line by way of test conductors TPT and TPR leading to the test circuits at the manual position. In order to do this the operator will dial the digit 3 for causing relay CB to repeat three impulses. The first release of relay CB effects the sequential operations of relays YA, YB and YC, with relay PA being operated in multiple with relay YA. Relays YA, YB and YC release in sequence at the end of the digit. Relay SA is operated and locked and relay PA is released at the end of the first impulse of the digit. Relay PB is operated at the beginning of the second impulse and relay SB is operated and locked and relay PB is released at the end of the second impulse. Relay PA is operated at the beginning of the third impulse, with relay SC being operated, locked and relay PA being released at the end of the third impulse, all in the previously described manner. The control conductor to the CB relay of the test connector is maintained energized as previously described. Relays SA, SB and SC are released when relay YC is released. When relay YB releases, with relay YC still operated, the executing circuit is extended through a make contact of relay CF, conductor 52, break contact of relay SD, make contact of relay SC, conductor 53, break contact of relay TL, conductor 54 and winding of relay TT to (−) for operating this relay which locks to (+) on the master ground conductor by way of a break contact of relay YB, and conductor 29.

When conductor INT is energized, no circuit operation is effected because relay TL is not operated under this condition. The test conductors TPT and TPR extending to the test position are now connected to the called line by way of make contacts of relay TT, break contacts of relay YC, conductors 24 and 25, break contacts of relay PA, break contacts of relay PB, conductors TT and TR and wipers TW and RW to the called line. This places the circuits in condition so that the test operator can make the usual tests of the called line circuit from the manual position.

*Release of test selector and test connector*

It will now be assumed that the calling party desires to effect the release of the test selector minor switch and the test connector being used. In order to do this, number 4 is dialed for transmitting four impulses to relay CB. Relays YA, YB and YC are operated in sequence at the beginning of the series of impulses and released in sequence at the termination of these four impulses. Counting relays SA, SB, SC and SD, in cooperation with relays PA and PB, count the number of impulses received by relay CB. It is believed desirable at this time to repeat some of the circuit description previously pointed out and to explain the circuit operations for effecting the counting of the impulses from relay CB, this counting of four impulses being the maximum provided in this circuit, since four relays SA—SD are used.

The release of relay CB at the beginning of the first impulse closes a circuit for operating relay PA which may be traced from (+), break contact of relay CB, make contact of relay RD, break contact of relay TL, break contact of relay XD, break contact of relay TL, conductor 13, make contact of relay CF, conductor 12, break contact of relay SA, conductor 17 and winding of relay PA to (−). When relay CB is operated at the end of this first impulse, the above described circuit to (+) is opened and relay SA operates and relay PA locks over a circuit which may be traced from (+) on the master ground conductor, break contact of relay TL, conductor 18, make contacts of relays YA and YC in multiple, upper winding of relay SA, break contact of relay SA, conductor 19, make contact and winding of relay PA to (−). The operation of relay SA closes a locking circuit for itself including the above described circuit, its upper winding, make contact and lower winding of relay SA to (—). The operation of relay SA opens up the above described locking circuit for relay PA for effecting the release of this relay.

When relay CB releases to mark the beginning of the second impulse, relay PB is operated over the above described circuit including conductor 13, make contact of relay CF, conductor 12, make contact of relay SA, break contact of relay SB, conductor 20 and winding of relay PB to (—). When relay CB operates to mark the end of the second impulse, the above described operating circuit for relay PB is opened and an operating circuit for relay SB and a locking circuit for relay PB is closed from (+) on the master ground conductor, break contact of relay TL, conductor 18, make contacts of relays YA and YC in multiple, upper winding of relay SB, break contact of relay SB, conductor 21, make contact and winding of relay PB to (—). The operation of relay SB closes a locking circuit for itself including the above described circuit and its upper winding, make contact and lower winding of relay SB to (—). The operation of relay SB opens up and releases relay PB.

When relay CB releases to mark the begining of the third impulse, a circuit is closed for again operating relay PA, this circuit extending from the previously described (+) on conductor 13, make contact of relay CF, conductor 12, make contacts in series of relays SA and SB, break contact to relay SC, conductor 17 and winding of relay PA to (—). When relay CB operates to mark the end of the third impulse, the above described operating circuit for relay PA is opened and an operating circuit for relay SC and a locking circuit for relay PA is completed from (+) on the master ground conductor, break contact of relay TL, conductor 18, make contacts in multiple of relays YA and YC, upper winding of relay SC, break contact of relay SC, make contact of relay SB, conductor 19, make contact and winding of relay PA to (—). The operation of relay SC completes a locking circuit for itself including the above described circuit and its upper winding, make contact and lower winding of relay SC to (—). The operation of relay SC opens up and releases relay PA.

When relay CB releases to mark the beginning of the fourth impulse, a circuit is again closed for operating relay PB extending from (+) on conductor 13, make contact of relay CF, conductor 12, make contacts in series of relays SA, SB and SC, break contact of relay SD, conductor 20 and winding of relay PB to (—). When relay CB operates to mark the end of the fourth impulse, the above described operating circuit for relay PB is opened and relay SD operates and relay PB locks over a circuit which may be traced from (+) on the master ground conductor, break contact of relay TL, conductor 18, make contacts in multiple of relays YA and YC, upper winding of relay SD, break contact of relay SD, make contact of relay SC, conductor 21, make contact and winding of relay PB to (—). The operation of relay SD opens up and releases relay PB and closes a locking circuit for relay SD including the above described circuit and its upper winding, make contact and lower winding of relay SD to (—).

Referring back to the operation of relay YB, when relay CB releases to mark the beginning of the first impulse, relay TT is released in the event that this relay had been left operated from a previous dialing operation. The release of relay TT is effected by the opening up of its locking circuit at the break contact of relay YB. The release of relay TT opens up the test conductors TPT and TPR.

At the end of this dialing operation (dialing digit 4) the release of relay YB, while relay YC is still operated, applies (+) potential to executing conductor EX for operating release magnet MZ of the minor switch. This circuit may be traced from (+) on the master ground conductor, conductor 29, break contact of relay YB, make contact of relay YC, conductor EX, make contact of relay CF, conductor 52, make contact of relay SD, conductor 55, make contact of relay RD, off normal contact 2XON, conductor 56 and winding of the magnet MZ to (—). This restores the minor switch, including wiper MW, to normal and when the normal position is reached, contact 2XON opens for deenergizing magnet MZ. Furthermore, when the normal position is reached a circuit is closed for operating relay XD extending from (+), make contact of relay RD, off normal contact 1XON in its normal position and lower winding of relay XD to (—). Relays SA, SB, SC, SD and CF are released when the minor switch reaches its normal position because (+) is disconnected from the master ground conductor by contact 1XON. The release of the minor switch causes wiper MW to restore to its normal position for opening up the control conductor leading to the test connector for effecting the release of this connector.

Since relay XD is now operated and the minor switch is in its normal position, the circuits are in the same condition as described at the beginning of this specification, that is, relays CB, RD, HS and XD are operated, with all other relays released. This places the circuits in condition for again dialing the hundreds, tens, units and other digits, all in the previously described manner.

*Monitor and test jack operations*

The monitor and test jack shown in the lower left hand portion of Fig. 1 is provided to enable the attendant at the community dial office, in which the test selector is located, to plug in with a test hand telephone and cause the circuits to go through the previously described testing operations in the same manner as when dialed by way of preceding switching devices. It is necessary to operate the HS relay when plugging into the test jack in order to connect the incoming tip and ring conductors by way of condensers C1 and C2 to the selected called line. When the test set is plugged into the test jack a circuit is closed for operating relays HS and CB, this circuit extending from (+), lower winding of relay HS, break contact of relay RD, tip of the test jack, through the test telephone, ring of the test jack, break contact of relay RV and lower winding of relay CB to (—). Relays CB and HS operate and when relay RD is operated by way of a make contact of relay CB, a locking circuit is closed for relay HS extending from (+), make contact of relay RD, make contact and upper winding of relay HS to (—). The closure of the lowermost make contact of relay HS extends the tip of the test jack up to the upper winding of relay CB and the operation of relay RD disconnects the lower winding of relay HS from this tip conductor. This places the circuits in condition for dialing operations since the test telephone (to which a dial is attached) is now connected to the windings of relay CB for repeating impulses transmitted from this telephone. When the test selector is operated from the test jack, the circuits function to automatically test the called line, to advance the test connector one step at a time, to repeat the test and to release the switches, all in the previously described manner.

Since relay HS connects the incoming line conductors through condensers C1 and C2 to the test selector wipers, toll offering or busy verification is provided by the circuits when operated from the monitor and test jack.

From the above, it will be seen that the test selector may be operated from the test jack and from a connection including a preceding switching device having (−) connected to the discriminating conductor HS for effecting the busy verification and all other operations previously described. This means that these operations may all be effected when the test selector is seized from a testing position, since it is assumed that discriminating conductor HS is connected to (−) when the circuit is seized from such a position. However, when the test selector is seized from a local line in the community dial office, the discriminating conductor HS is not connected to battery so that relay HS will not be operated. This prevents the busy verification or the cutting in on a busy line because the circuits extending to wipers TW and RW are open at contacts of relay HS. This is necessary to make it impossible for some unauthorized person in the community dial office to call a busy line and listen in on the connection. Even though relay HS is not operated, the automatic testing, stepping, repeating and release operations may be effected in the previously described manner, thus making it possible for a service man calling in from any telephone in the community dial office to effect these operations and determine the condition of a called line by the number of clicks transmitted back to the calling station by the operation of relay RV, all in the previously described manner.

*Clearing out operation*

When the calling party is through with the test selector and test connector circuits, these circuits may be cleared out and restored to normal by the usual disconnect operation for opening up the incoming line conductors. This effects the release of relay CB for a sufficiently long period of time to release relay RD. The release of relay RD disconnects (+) potential from the master ground conductor for releasing any relay that may have been operated, including relay XD. The release of relay CB closes a circuit for operating magnet MX extending from (+), break contact of relay CB, make contact of relay RD, break contact of relay TL, make contact of relay XD and winding of magnet MX to (−). This circuit is opened when relay RD is released for de-energizing magnet MX. It will be understood that this preliminary step of the MX magnet performs no function at this time. When relay RD is released, the minor switch release magnet MZ is energized over a circuit extending from (+), break contact of relay RD, off normal contact 2XON and winding of magnet MZ to (−). When the minor switch reaches normal and contact 2XON is opened, magnet MZ is de-energized, thus placing the circuits in normal condition.

While certain embodiments of my invention have been described and shown for the purpose of illustration, it will be understood that modifications, adaptations and alterations thereof occurring to one skilled in the art may be made within the scope of my invention as defined in the appended claims.

What I claim is:

1. In a telephone system, a test selector, a signaling relay in said test selector, a calling line and a called line each comprising a pair of line conductors, means including said test selector for extending a connection from the line conductors of said calling line to the line conductors of said called line, means including a talking condenser for providing a talking circuit between said calling line and said called line conductors in response to the extension of said connection when said called line is idle, means responsive to the extension of said connection when said called line is busy for operating said relay, means responsive to the extension of said connection when said called line is idle for automatically testing said called line for a faulty or a non-faulty condition, means responsive to said automatic test of said called line for intermittently operating said relay, means controlled by the operation of said relay for transmitting a signal back to said calling line, and means for connecting said talking condensers across the line conductors of said calling line for controlling the volume of said signal.

2. In a telephone system, a test selector, a signaling relay in said test selector, a calling line and a called line each comprising a pair of line conductors, means including said test selector for extending a connection from the line conductors of said calling line to the line conductors of said called line, means including a pair of talking condensers for providing a talking circuit between said calling line and said called line conductors in response to the extension of said connection when said called line is idle, means responsive to the extension of said connection when said called line is busy for operating said relay, means responsive to the extension of said connection when said called line is idle for automatically testing said called line for a faulty or a non-faulty condition, means responsive to said automatic test of said called line for intermittently operating said relay, means controlled by the operation of said relay for transmitting a signal back to said calling line, and means for connecting one of said talking condensers across the line conductors of said calling line for controlling the volume of said signal.

3. In a telephone system, a test selector, a signaling relay in said test selector, a calling line and a called line each comprising a pair of line conductors, a battery feed circuit for said calling line, means including said test selector for extending a connection from the line conductors of said calling line to the line conductors of said called line, means including a pair of talking condensers for providing a talking circuit between said calling line and said called line conductors in response to the extension of said connection when said called line is idle, means responsive to the extension of said connection when said called line is busy for operating said relay, means responsive to the extension of said connection when said called line is idle for automaticaly testing said called line for a faulty or a non-faulty condition, means responsive to said automatic test of said called line for intermittently operating said relay, means controlled by the operation of said relay for reversing said battery feed circuit for transmitting a signal back to said calling line, and means for connecting one of said talking condensers across the line conductors of said calling line for controlling the volume of said signal.

4. In a testing system for telephone lines; a test selector comprising a selecting device and a series of counting relays; trunk conductors incoming to said test selector; means for transmitting a plurality of digits over said trunk conductors, each digit comprising one or more impulses; means responsive to certain of said digits and including said selecting device for extending a connection to one of said lines; means responsive to said certain digits for operating said series of counting relays step by step to count the number of said certain digits; means responsive to a particular number of digits counted by said series of counting relays for causing said series of counting relays to restore and then operate automatically step by step through an operating cycle; and means for automatically making a test of said one line for a faulty or a non-faulty condition during said operating cycle.

5. In a testing system for telephone lines; a test selector comprising a selecting device and a series of counting relays; trunk conductors incoming to said test selector; means for transmitting a plurality of digits over said trunk conductors, each digit comprising one or more impulses; means responsive to certain of said digits and including said selecting device for extending a connection to one of said lines; means responsive to said certain digits for operating said series of counting relays step by step to count the number of said certain digits; means responsive to a particular one of said digits counted by said series of counting relays for causing said series of counting relays to restore and then operate automatically step by step through an operating cycle; and means including contacts on said counting relays for automatically making a test of said one line for a faulty or a non-faulty condition during said operating cycle.

6. In a testing system for telephone lines; a test selector comprising a selecting device and a series of counting relays; trunk conductors incoming to said test selector; means for transmitting a plurality of digits over said trunk conductors, each digit comprising one or more impulses; means responsive to certain of said digits and including said selecting device for extending a connection to one of said lines; means responsive to said certain digits for operating said series of counting relays step by step to count the number of said certain digits; means responsive to a particular one of said digits counted by said series of counting relays for causing said series of counting relays to restore and then operate automatically step by step through an operating cycle; means including contacts on said counting relays for automatically making a test of said one line for a faulty or a non-faulty condition during said operating cycle; and means including said series of counting relays responsive to an additional digit for causing said series of counting relays to restore and to repeat said automatic test of said one line.

7. In a testing system for telephone lines; a test selector comprising a selecting device and a series of counting relays; trunk conductors incoming to said test selector; means for transmitting a plurality of digits over said trunk conductors, each digit comprising one or more impulses; means responsive to certain of said digits and including said selecting device for extending a connection to one of said lines; means responsive to said certain digits for operating said series of counting relays step by step to count the number of said certain digits; means responsive to a particular one of said digits counted by said series of counting relays for causing said series of counting relays to restore and then operate automatically step by step through an operating cycle; means including contacts on said counting relays for automatically making a test of said one line for a faulty or a non-faulty condition during said operating cycle; means including said series of counting relays responsive to an additional digit for causing said series of counting relays to restore and to repeat said automatic test of said one line; and means for transmitting signals back over said trunk conductors during said repeated test indicative of the faulty or non-faulty condition of the line being tested.

8. In a testing system for telephone lines; a test selector comprising a selecting device and a series of counting relays; a test connector; trunk conductors incoming to said test selector; means for transmitting a plurality of digits over said trunk conductors, each digit comprising one or more impulses; means responsive to certain of said digits and including said selecting device and said test connector for extending a connection to one of said lines; means responsive to said certain digits for operating said series of counting relays step by step to count the number of said certain digits; means responsive to a particular one of said digits counted by said series of counting relays for causing said series of counting relays to restore and then operate automatically step by step through an operating cycle; means including contacts on said counting relays for automatically making a test of said one line for a faulty or a non-faulty condition during said operating cycle; and means including said series of counting relays responsive to an additional digit for advancing said test connector to another one of said lines.

9. In a testing system for telephone lines, a test selector comprising a selecting device and a series of counting relays, a test connector, trunk conductors incoming to said test selector, means for transmitting a plurality of digits over said trunk conductors, a control conductor extending from said test selector to said test connector, means responsive to certain of said digits and including said selecting device for impulsing said control conductor for extending a connection from said test selector by way of said test connector to one of said lines, means responsive to said certain digits for operating said series of counting relays step by step to count the number of said certain digits, means responsive to an additional one of said digits for causing said series of counting relays to operate a second time, and means controlled in accordance with the number of impulses effecting said second operation of said counting relays for releasing said test connector or for advancing it to another of said lines.

10. In a testing system for telephone lines, a test selector comprising a selecting device and a series of counting relays, a test connector, trunk conductors incoming to said test selector, means for transmitting a plurality of digits over said trunk conductors, a control conductor extending from said test selector to said test connector, means responsive to certain of said digits and including said selecting device for impulsing said control conductor for extending a connection from said test selector by way of said test connector to one of said lines, means responsive to said certain digits for operating said series of counting relays step by step to count the number of said certain digits, means responsive to an additional one of said digits for causing said series of counting relays to operate a second time, means controlled in accordance with the number of impulses effecting said second operation of said counting relays for releasing said test connector or for advancing it to another of said lines, and means effective after said advance of said test connector and including said counting relays for automatically testing the line conductors of said other line for a faulty or a non-faulty condition.

11. In a testing system for subscribers' telephone lines in a telephone system, a directively controlled test selector through which connections are made to any of said lines, a pair of line conductors incoming to said test selector, a discriminating conductor incoming to said test selector, means controlled over said line conductors for establishing a talking connection to a busy one of said lines, means included in said test selector for automatically testing the line conductors of any one of said lines for a faulty or a non-faulty condition, and means controlled over said discriminating conductor for permitting the initiation of the automatic testing of said line conductors and for preventing the establishment of said talking connection.

12. In a testing system for subscribers' telephone lines in a telephone system, a directively controlled test selector through which connections are made to any one of said lines, a pair of line conductors incoming to said test selector, a discriminating conductor incoming to said test selector, means controlled over said line conductors for establishing talking connections to busy ones of said lines, means included in said test selector for automatically testing the line conductors of any one of said lines for a faulty or a non-faulty condition, means controlled over said discriminating conductor for permitting the initiation of the automatic testing of said line conductors and for preventing the establishment of said talking connection, and means for transmitting indication signals back over said line conductors indicative of a faulty or a non-faulty condition of the tested line conductors.

13. In a test selector, a signaling relay, a calling line and a called line each comprising a pair of line conductors, means including said test selector for extending a connection from the line conductors of said calling line to the line conductors of said called line, a test relay, means for operating said test relay, means including a talking condenser and contacts of said test relay for providing a talking circuit between said calling line and said called line conductors responsive to the extension of said connection when said called line is idle, means responsive to the extension of said connection when said called line is busy for operating said signaling relay, means controlled by the operation of said signaling relay for transmitting a signal back to said calling line, and means including contacts of said test relay for connecting said talking condenser across the line conductors of said calling line for reducing the intensity of said signal.

14. In a test selector, a signaling relay, a calling line and a called line each comprising a pair of line conductors, means including said test selector for extending a connection from the line conductors of said calling line to the line conductors of said called line, a test relay, means for operating said test relay, means including a pair of talking condensers and contacts of said test relay for providing a talking circuit between said calling line and said called line conductors responsive to the extension of said connection when said called line is idle, means responsive to the extension of said connection when said called line is busy for operating said signaling relay, means controlled by the operation of said signaling relay for transmitting a signal back to said calling line, and means including contacts of said test relay for connecting one of said talking condensers across the line conductors of said calling line for reducing the intensity of said signal.

15. In a test selector, a signaling relay, a calling line and a called line each comprising a pair of line conductors, a battery feed circuit for said calling line, means for extending a connection from said calling line to the line conductors of said called line, means including a pair of talking condensers for providing a talking circuit between said calling line and said called line conductors responsive to the extension of said connection when said called line is idle, means responsive to the extension of said connection when said called line is busy for operating said relay, means controlled by the operation of said relay for reversing said battery feed circuit to said calling line conductors for transmitting a signal back to the calling station, and means for connecting one of said talking condensers across said calling line conductors for reducing the intensity of said signal.

16. In a test selector for testing telephone lines in service for the presence or absence of potential on the line conductors thereof, a line testing relay and a step by step device, an interrupter, means including said interrupter for applying a series of pulses to an interrupter conductor, a source of testing potential, means controlled by the pulses on said conductor for advancing said step by step device for automatically and sequentially connecting said source of testing potential and said line testing relay to a line being tested, and means including said line testing relay responsive to the presence of potential on the line conductors of the line being tested for stopping the advance of said step by step device by said pulses.

17. In a test selector for testing telephone lines in service for the presence or absence of potential on the line conductors thereof, a line testing relay and a plurality of counting relays, an interrupter, means including said interrupter for applying a series of pulses to an interrupter conductor, a source of testing potential, means controlled by said pulses for advancing said counting relays for automatically and sequentially connecting said testing potential and said line testing relay to a line being tested, and means including said line testing relay responsive to the presence of potential on the line conductors of the line being tested for stopping the advance of said counting relays by said pulses.

18. In a test selector for testing telephone lines in service for the presence or absence of potential on the line conductors thereof, a line testing relay and a plurality of counting relays, an interrupter, means including said interrupter for applying a series of pulses to an interrupter conductor, a source of testing potential, means including a slow acting relay controlled by said pulses for advancing said counting relays for automatically and sequentially connecting said testing potential and said line testing relay to a line being tested, and means including said line testing relay responsive to the presence of potential on either one of the line conductors of the line being tested for stopping the advance of said counting relays by said pulses.

19. In a test selector for testing telephone lines in service for the presence or absence of potential on the line conductors thereof, incoming trunk conductors connected to said test selector, a line testing relay and a step by step device, an interrupter, means including said interrupter for applying a series of pulses to an interrupter conductor, a source of testing potential, means controlled by said pulses for advancing said step by step device for automatically and sequentially connecting said testing potential and said line testing relay to a line being tested, means including said line testing relay responsive to the presence of potential on one or the other of the line conductors being tested for stopping the advance of said step by step device by said pulses, and means for transmitting signals back over said trunk conductors indicative of the presence or absence of potential on the line conductors being tested.

20. In a test selector for testing telephone lines in service for the presence or absence of potential on the line conductors thereof, incoming trunk conductors connected to said test selector, a line testing relay and a step by step device, an interrupter, means including said interrupter for applying a series of pulses to an interrupter conductor, a source of testing potential, means controlled by said pulses for advancing said step by step device for automatically and sequentially connecting said testing potential and said line testing relay to a line being tested, means including said line testing relay responsive to the presence of potential on one or the other of the line conductors being tested for stopping the advance of said step by step device by said pulses, and means for transmitting signals back over said trunk conductors during the step by step operation of said device indicative of the presence or absence of potential on the line conductors being tested.

FRANK KESSLER.

REFERENCES CITED

The following references are of record in the file of this patent:

UNITED STATES PATENTS

| Number | Name | Date |
|---|---|---|
| 1.881,544 | Hartley | Oct. 11, 1932 |
| 2,006,354 | Hovland | July 2, 1935 |
| 2,091,116 | Griffins | Aug. 24, 1937 |
| 2,101,258 | Korn | Dec. 7, 1937 |
| 2,187,784 | Hersey | Jan. 23, 1940 |
| 2,234,272 | Morrow | Mar. 11, 1941 |
| 2,301,837 | Wiley | Nov. 10, 1942 |